United States Patent
Oba et al.

(10) Patent No.: US 7,860,978 B2
(45) Date of Patent: Dec. 28, 2010

(54) ESTABLISHING A SECURE TUNNEL TO ACCESS ROUTER

(75) Inventors: Yoshihiro Oba, Torrance, CA (US); Shinichi Baba, Irvine, CA (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 10/761,347

(22) Filed: Jan. 22, 2004

(65) Prior Publication Data

US 2005/0165953 A1    Jul. 28, 2005

(51) Int. Cl.
*G06F 15/16* (2006.01)
(52) U.S. Cl. .................. 709/227; 709/200; 709/225; 709/228
(58) Field of Classification Search ............ 709/225, 709/200, 227, 228
See application file for complete search history.

(56) References Cited

U.S. PATENT DOCUMENTS

| | | | |
|---|---|---|---|
| 6,636,898 B1* | 10/2003 | Ludovici et al. | 709/250 |
| 2002/0069278 A1* | 6/2002 | Forslow | 709/225 |
| 2002/0196802 A1* | 12/2002 | Sakov et al. | 370/432 |
| 2003/0145104 A1* | 7/2003 | Boden et al. | 709/238 |
| 2004/0019664 A1* | 1/2004 | Le et al. | 709/220 |
| 2004/0236855 A1* | 11/2004 | Peles | 709/227 |
| 2005/0108386 A1* | 5/2005 | Acharya et al. | 709/224 |

FOREIGN PATENT DOCUMENTS

| | | |
|---|---|---|
| JP | 2001-016255 A | 1/2001 |
| JP | 2001-237892 A | 8/2001 |
| JP | P2002-044076 A | 2/2002 |
| JP | 2002-135313 A | 5/2002 |
| JP | 2003-143236 A | 5/2003 |
| JP | P2003-167805 A | 6/2003 |

OTHER PUBLICATIONS

Godber et al. "Secure Wireless Gateway." 2002. ACM Proceedings on Wireless Security, pp. 41-46.*
"Multi-Link Technology White Paper." Oct. 2001. www.Stonesoft. com White Papers. pp. 1-15.*
L. Mamakos, et al., "A Method for Transmitting PPP Over Ethernet (PPPoE)," RFC 2516, Feb. 1999, pp. 1-20, USA.

(Continued)

*Primary Examiner*—Larry Donaghue
*Assistant Examiner*—Nicholas Taylor
(74) *Attorney, Agent, or Firm*—Watchstone P&D, PLLC (57) ABSTRACT

In some illustrative embodiments, an IP-layer based network selection and multihoming method is provided that enables a flexible and secure dynamic selection of one or more serving networks for use by a client node. The method is independent of any link-layer technology. A serving network can be an ISP network, a NAP network exchange facility, a VLAN, or the like. Network information is advertised to a client node, the client node is authenticated and authorized for use of an access router, and a secure tunnel is established between the client node and the access router. The method can be implemented by using standard protocols, and can work over any existing or future link-layer technologies that are able to carry IP datagrams, without any modification.

26 Claims, 8 Drawing Sheets

OTHER PUBLICATIONS

W. Simpson, "The Point-to-Point Protocol (PPP)," RFC 1661, Jul. 1994, USA.

S. Cheshire, "Dynamic Configuration of Link-Local IPv4 Addresses," Internet Draft, Jan. 2004, p. 1-32, USA.

S. Thomson, "IPv6 Stateless Address Autoconfiguration," RFC 2462, Dec. 1998, p. 1-24, USA.

J. Arkko, "SEcure Neighbor Discovery (SEND)," Internet Draft, Aug. 2003, p. 1-51, USA.

R. Droms, "Dynamic Host Configuration Protocol," RFC 2131, Mar. 1997, p. 1-43, USA.

R. Droms, "Dynamic Host Configuration Protocol for IPv6 (DHCPv6)," RFC 3315, Jul. 2003, p. 1-100, USA.

B. Aboba, "Virtual Access Points," IEEE 802.11-03/154r1, May 2003, p. 1-13, USA.

D. Forsberg, "Protocol for Carrying Authentication for Network Access (PANA)," Internet Draft, Jun. 2003, p. 1-49, USA.

S. Deering, "ICMP Router Discovery Messages," RFC 1256, Sep. 1991, p. 1-18, USA.

T. Narten, "Neighbor Discovery for IP Version 6 (IPv6)," RFC 2461, Dec. 1998, p. 1-87, USA.

D. Harkins, "The Internet Key Exchange (IKE)," RFC 2409, Nov. 1998, p. 1-39, USA.

C. Kaufman, "Internet Key Exchange (IKEv2) Protocol", Internet Draft, Oct. 2003, p. 1-108, USA.

L. Blunk, "PPP Extensible Authentication Protocol (EAP)," RFC 2284, Mar. 1998, p. 1-15, USA.

B. Aboba, "EAP Key Management Framework," Internet Draft, Oct. 2003, p. 1-55, USA.

M. Parthasarathy, "PANA enabling IPsec based Access Control," Internet Draft, Oct. 2003, p. 1-11, USA.

O. Troan, "IPv6 Prefix Options for DHCPv6," Internet Draft, Oct. 2003, p. 1-20, USA.

C. Perkins, "IP Mobility Support for IPv4," RFC 3344, Aug. 2002, p. 1-98, USA.

D. Johnson, "Mobility Support in IPv6," Internet Draft, Jun. 2004, p. 1-163, USA.

Satoshi Uda, 'Proposal of Multi-homing Architecture of Miltiple-Routing Type', A new multi-homing architecture based on overlay network, Technical Reports of Information Processing Society, vol. 2003, No. 101, APAJ SIG Technical Reports, Japan, Information Processing Society of Japan (Oct. 8, 2003).

Dan Forsberg, Jarno Rajahalme, Secure Network Access Authentication (SeNAA), <draft-forsberg-pana-secure-network-access-auth-01.txt>[online], Finland, Internet Engineering Task Force, (Sep. 2002), The internet <http://tools.ietf.org/html/draft-forsberg-pana-secure-network-access-auth-01> [searched Apr. 2, 2009].

Yasuhiro Katsube, 'Frontiers of Research & Development', Toshiba Review, vol. 58, No. 5, Toshiba Review, Japan, Kabushiki Kaisha Toshiba, Toshiba Corporation, (May 1, 2003) (relating to authentication using the PANA protocol).

Office Action related to corresponding PCT application, Japanese patent application 2006-551325.

Japanese Office Action dated Jun. 16, 2009, issued in corresponding Japanese patent application No. 2006-551325.

Yasuhiro Katsube, "Comfortable Radio IP Communication Is Realized Based on Mobility, Security and Quality Technologies", Frontiers of Research & Development, Toshiba Review, vol. 58, No. 5, Toshiba Review, Japan, Kabushiki Kaisha Toshiba, Toshiba Corporation, (May 1, 2003) (relating to authentication using the PANA protocol).

* cited by examiner

ESTABLISHING A SECURE TUNNEL TO ACCESS ROUTER

BACKGROUND

1. Field of the Invention

The present invention relates generally to network communications and preferred embodiments relate more particularly to communication network service provider selection at a single client location from among a number of different available providers. In accordance with some preferred embodiments, the invention relates to Internet Service Provider (ISP) selection and multihoming by a user at a client node on an access network.

2. Background Discussion

Multihoming is the technique of connecting to the Internet via two or more ISPs, either simultaneously or dynamically. Multihoming has a number of advantages, including providing an essential back-up connection to the public Internet if one ISP fails, improved regional and local connectivity, increased bandwidth, and availability of load-sharing which can improve performance. Currently, there are many situations where multiple ISPs are available at a single user location. For example, home users can choose one ISP via a dial-up connection and another ISP via a cable or DSL (Digital Subscriber Line) modem connection.

DSL providers that use PPPoE (Point-to-Point Protocol over Ethernet) for IP encapsulation can allow subscribers to choose one of a number of connected ISPs, either statically during the initial sign-up, or dynamically by using NAIs (Network Access Identifiers) provided by the subscribers during the PPP authentication phase or by carrying ISP information in the PPPoE discovery stage.

In IEEE 802 LANs (Local Area Networks), a VLAN (Virtual LAN) is used to partition a LAN into multiple smaller LANs. A VLAN is a network of computers that behave as if they are connected to the same wire even though they actually may be physically located on different segments of a LAN. VLANs can be configured through software rather than hardware, which makes them extremely flexible. When a client node is connected to a VLAN through a wired Ethernet connection, the mapping between the Ethernet port of the client node and the VLAN is statically configured in most cases. In public wireless LAN environments, the IEEE 802.11 SSID (Service Set IDentifier) advertised by access points can contain service provider information. SSID also is used for dynamically selecting a VLAN by creating a static mapping between SSID and VLAN, so that stations that are associated with an access point by specifying a particular SSID are connected to a particular VLAN mapped to that SSID.

The current methods for selecting an ISP or a VLAN are closely tied to particular link-layer technologies (i.e., PPP and IEEE 802.11) and therefore are difficult to apply across all link-layer technologies. As such, in an environment where access networks are heterogeneous or more flexibility in VLAN assignment to client nodes is needed, it would be desirable to have an IP (Internet Protocol) layer solution that is independent of any link-layer technology.

As a simple IP-layer solution, it is possible to place multiple access routers in an access network where each access router is connected to a particular ISP or a VLAN, such that a client node on the access network can select a particular access router to send and receive data packets. However, the simple solution has two problems. First, information leakage could occur in the access network among multiple ISPs or VLANs, especially when the access network uses multi-access technologies. Second, if ingress filtering is performed at the access routers, the simple solution is difficult to implement where a client node with a single physical interface is allowed to connect to two or more ISPs or VLANs simultaneously. Ingress filtering is a technique for preventing attackers from injecting packets with a forged source IP address as if they were generated in a different network than the access network to which the access router attaches. In an access network where ingress filtering is employed, a packet generated in the access network can pass through an access router only when it has a source address with a network prefix that is assigned by the router to the network interface where the packet was received. However, most host implementations do not provide any method to choose an appropriate source address when multiple routable IP addresses with different network prefixes are assigned to a given interface, as would be the case where simultaneous connection to different ISPs or VLANs is enabled.

Consequently, there exists a need in the art for, among other things, a solution that prevents any information leakage to occur and also that protects against IP address spoofing attacks.

SUMMARY OF THE INVENTION

The preferred embodiments of the present invention can significantly improve upon existing methods and/or apparatuses. In some embodiments, the present invention provides substantial improvements over the above-mentioned methods.

According to one aspect of the invention, a new IP-layer based model for network selection and multihoming is provided that enables a flexible and secure dynamic selection of one or more serving networks to use, where a serving network is an ISP network, a NAP (Network Access Point) network exchange facility, a VLAN, etc. The IP-layer based model according to one preferred embodiment consists of three phases. Network information is advertised to a client node in the first phase, the client node is authenticated and authorized for use of an access router in the second phase, and a secure tunnel is established between the client node and the access router in the third phase. The inventive model can be implemented by using standard protocols, and can work over any existing or future link-layer technologies that are able to carry IP datagrams, without any modification.

In particular, according to one preferred embodiment, the present invention provides a method of dynamically connecting a client node to a serving network, including the steps of providing an access network to which a client node has a network connection; providing at least one access router having a network connection to the access network and having a network connection to at least one serving network; sending serving network provider advertising information to the client node in response to a request message from the client node; receiving from the client node serving network provider information specifying a serving network to which the client node desires access; and establishing a secure communication tunnel between the client node and the access router through the access network, such that the client node is able to send and receive data packets to and from the serving network specified by the client node within the secure communication tunnel through the access network.

According to a second aspect, the invention provides a method of connecting a client node to multiple Internet service providers, including the steps of providing an access network through which the client node may communicate with the multiple Internet service providers; and establishing a separate secure communication tunnel within the access network for each of the multiple Internet service providers, such that the client node is able to send and receive data packets to and from each of the Internet service providers within the separate secure communication tunnels through the access network.

According to a third aspect, the invention provides a method of connecting a client node to a serving network, including the steps of providing an access router having a network connection to at least two serving networks; receiving from the client node serving network information specifying a serving network to which the client node desires to have access; establishing a secure communication tunnel between the client node and the access router through the access network, such that the client node is able to send and receive data packets to and from the serving network specified by the client node within the secure communication tunnel through the access network; and binding the secure communication tunnel to the specified serving network by using serving network information of the specified serving network as a security association identifier of the secure communication tunnel.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

DESCRIPTION OF THE DRAWINGS

The preferred embodiments of the present invention are shown by a way of example, and not limitation, in the accompanying figures, in which.

DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Figure 1:
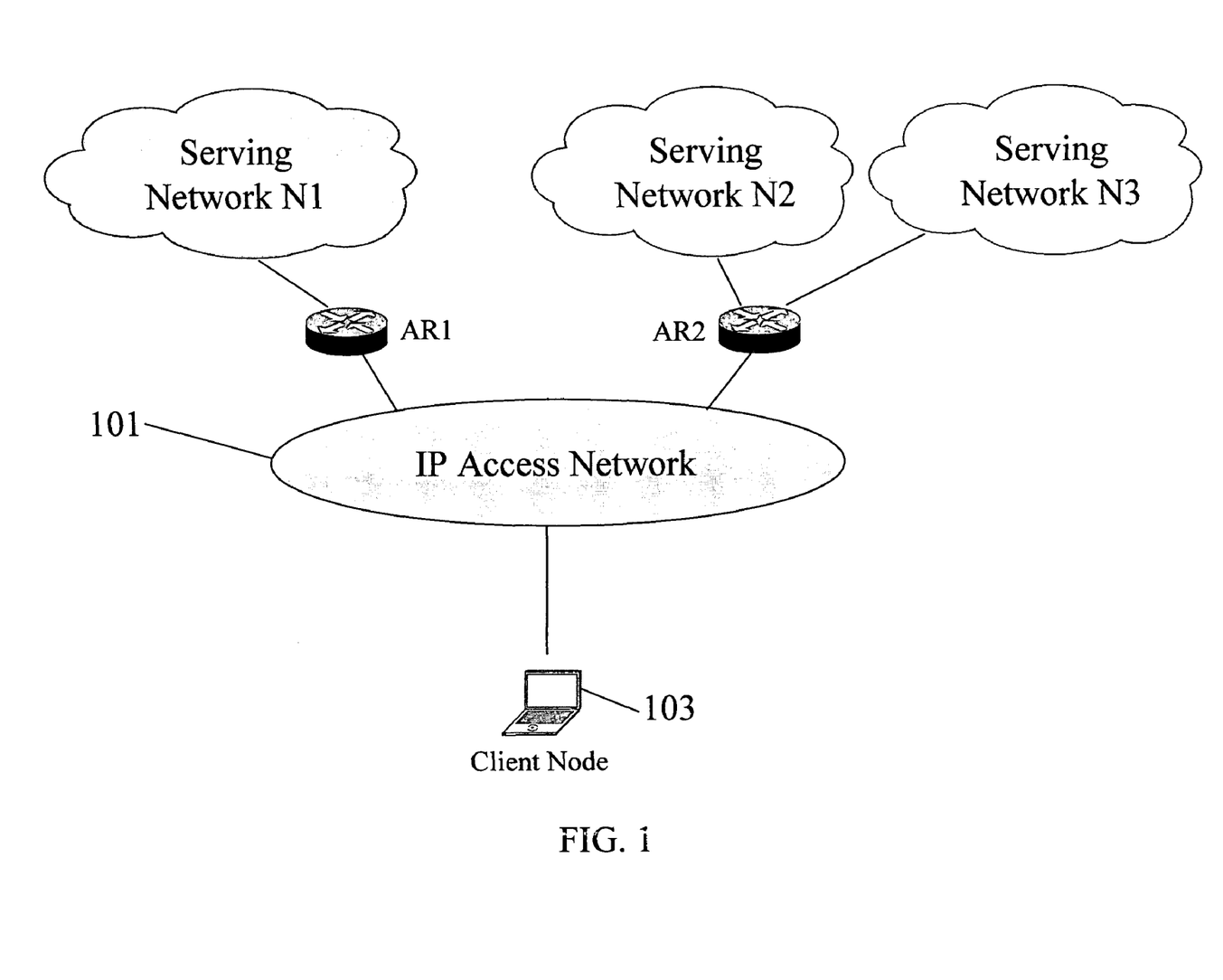
FIG. 1 is a diagram of a physical network topology according to one preferred embodiment of the invention.

An example physical topology of the proposed IP-layer model according to a preferred embodiment of the invention is illustrated in FIG. 1. As shown, an IP access network 101 includes access routers AR1 and AR2 and a client node 103. Additional nodes on the access network are not shown for purposes of simplification. Access router AR1 is connected to serving network N1, and access router AR2 is connected to serving networks N2 and N3. In the IP access network 101, client node 103 can communicate with the access routers as well as other nodes (not shown), by using a routable or non-routable IP address that is valid for communication within the access network. When the client node 103 needs to send or receive data packets through a serving network, it establishes a secure tunnel (logical interface) using IP Security protocol (IPSec tunnel) to the access router of that serving network through the IP access network. Tunneling allows one network to send its data through another network's connections, and works by encapsulating a network protocol within packets carried by the second network. For example, PPTP (Point-to-Point Tunneling Protocol) technology enables organizations to use the Internet to transmit data across a VPN (Virtual Private Network). It does this by embedding its own network protocol within the TCP/IP packets carried by the Internet.

The established IPSec tunnel is a secure logical interface that provides confidentiality, integrity and replay protection for packets passing through the access router, which also prevents the packets from being leaked to other serving networks. Additionally, the IPSec tunnel establishes a logical tunnel interface overlaying the physical interface of the node. This guarantees that a particular interface address (i.e., the address assigned to a particular logical tunnel interface) is used as the source address of packets forwarded to the corresponding access router. Access routers that employ ingress filtering will never drop packets having such a source address, since it will contain the network prefix assigned to the logical interface by the access router.

Figure 2:
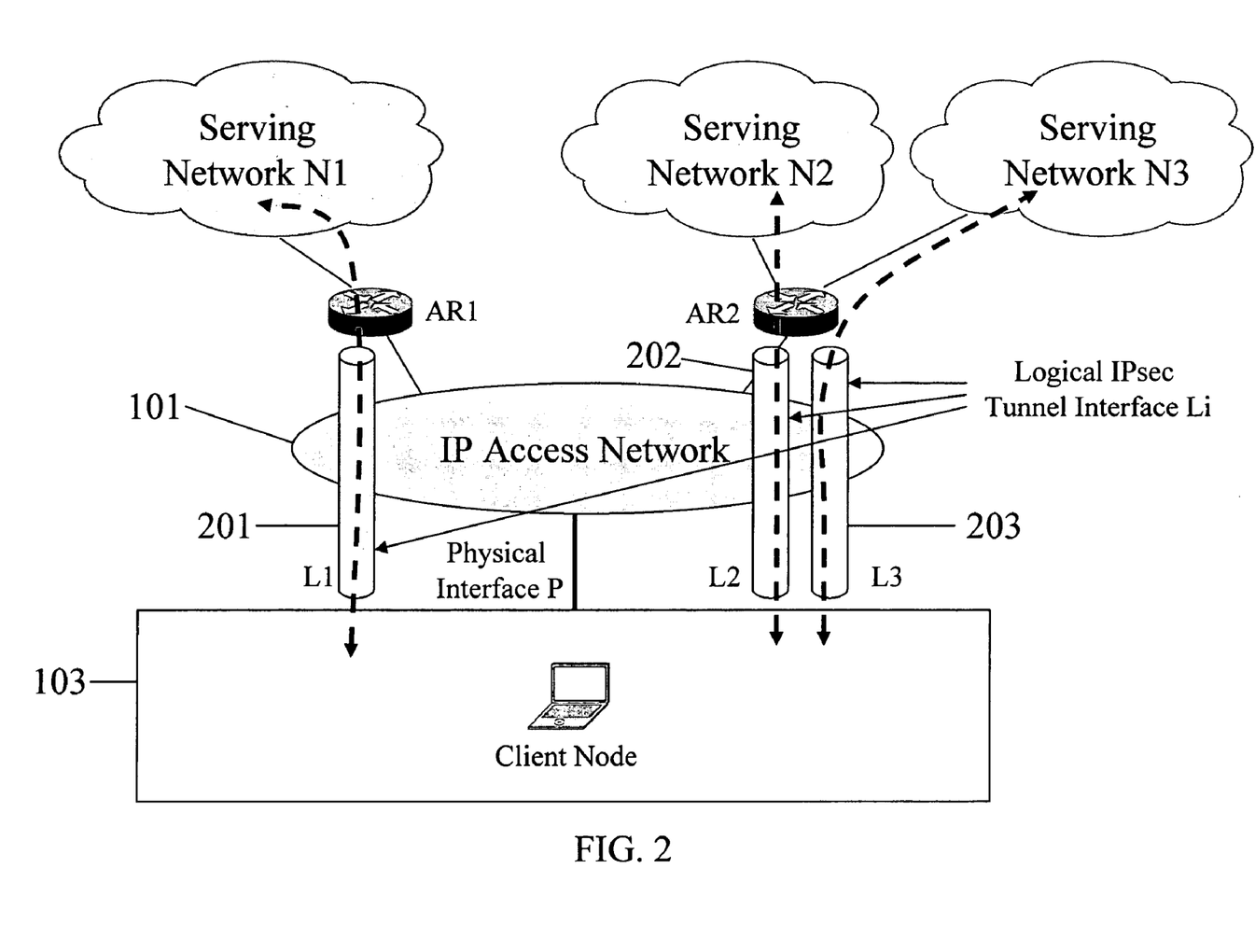
FIG. 2 is a diagram of a logical network topology according to one preferred embodiment of the invention overlaying the topology of FIG. 1.

An example logical topology that overlays the physical topology of FIG. 1 is illustrated in FIG. 2. As shown, the client node 103 has three IPSec tunnels 201, 202 and 203, each associated with a distinct logical interface L1, L2 or L3. The logical interfaces L1, L2 and L3 are used for sending and receiving data packets through particular serving networks N1, N2 and N3, respectively. The serving networks N1, N2 and N3 can be ISPs, NAPs, VLANS, or similar serving networks. The IPSec tunnel 201 corresponding to logical interface L1 is terminated at access router AR1. The IPSec tunnels 202 and 203 corresponding to logical interfaces L2 and L3 are terminated at access router AR2.

The interface address of each logical interface L1, L2 and L3 of the client node 103 is assigned from the address block of the corresponding serving network. In the example as shown, the client node 103 can send and receive data packets through any of the three serving networks N1, and N2 and N3. Of course, it is also possible for the client node to establish connectivity to only one or two of the serving networks instead of all three serving networks. A client node that has on-link connectivity to the access network can be a workstation or a router.

The client node 103 can use an IP address that is a routable address or a non-routable address for communicating with other nodes in the access network 101. A non-routable address is not allowed to be forwarded by a router while a routable address can be forwarded by a router. An example of non-routable address is an IPv4 link-local address or an IPv6 link-local address, for which the client node 103 can autonomously generate the address. Especially when an IPv6 link-local address is used, SEND (SEcure Neighbor Discovery) can be used for protecting IPv6 Neighbor Discovery exchanges. When a routable address is used, it can be either statically configured or dynamically configured, using any method including DHCP (Dynamic Host Configuration Protocol), DHCPv6 or IPv6 address auto-configuration.

It is not necessary to use the IPSec key management protocol to establish a tunnel if security is not crucial for the serving network providing the service, such as for a public service access network. In such case, other IP tunneling schemes may be used, such as for example IP-in-IP or GRE (Generic Routing Encapsulation).

Serving Network Information Advertising

Many wireless LAN hotspot service providers currently use 802.11 SSID that is included in a broadcast beacon frame to advertise service provider information to wireless clients. A technique called virtual access point (VAP) can extend this usage so that a single physical access point can be divided into multiple virtual access points, each of which acts as if it were a distinct physical access point, by advertising a distinct SSID for each VLAN. A disadvantage of VAP is that it is closely tied with a particular access technology and is difficult to apply to other access technologies. Another disadvantage is that more bandwidth is occupied by beacon frames and thus the total data traffic throughput will decrease. For example, if there are 10 virtual access points and each virtual access point generates a beacon frame every 100 msec, a station will receive a beacon frame every 10 msec, in which case more than 30% of the link bandwidth of IEEE 802.11b will be occupied by beacon frames.

According to the present invention in contrast, network layer protocols are used for advertising serving network information to the client nodes on the access network 101. When the routable networks are ISP or NAP networks, a provide identifier and provider name data pair may be advertised per each service provider, where the provider identifier is a unique identifier that is used to identify the provider and the provider name is a character string that represents the name of the provider. When the serving networks are VLANs, a VLAN identifier and VLAN name may be advertised per VLAN, where the VLAN identifier is a unique identifier that is used to identify the VLAN and the VLAN name is a character string that represents the name of the VLAN. The VLAN advertising information may be sent over IP when the access network is not also a VLAN.

According to one preferred embodiment of the invention, information concerning the serving networks is advertised by using PANA (Protocol for carrying Authentication information for Network Access). In some scenarios, an IP-based device is required to authenticate itself to the network prior to being authorized to use it. This authentication usually requires a protocol that can support various authentication methods. In the absence of such an authentication protocol on most of the link-layers, architectures have resorted to using a number of inadequate authentication methods. PANA defines a protocol that allows clients to authenticate themselves to the access network using IP protocols that allow a client to interact with a site's back-end AAA (Authentication, Authorization, and Accounting) infrastructure to gain access without needing to understand the particular AAA infrastructure protocols that are in use at the site. It also allows such interactions to take place without a link-layer specific mechanism. PANA is applicable to both multi-access and point-to-point links. The present invention makes use of the PANA protocols to provide serving network information to client nodes on the access network.

PANA is a client-server type protocol where the client and server are referred to as a PaC (PANA Client) and a PAA (PANA Authentication Agent), respectively. In the invention, client node 103 is a PaC. A PAA is placed in the access network and may or may not be co-located with an access router. When a PAA is not co-located with an access router, it uses another protocol such as SNMP (Simple Network Management Protocol) or Diameter to send authorization information on authorized clients to some or all of the access routers connected to the serving network(s) to be advertised by the PAA.

The advertising sequence can be performed as follows:
1. A PaC sends a PANA-PAA-Discover message that may be multicast within the access network or unicast to a particular PAA.
2. Each PAA that received the PANA-PAA-Discover message sends a PANA-Start-Request message back to the PaC. The PANA-Start-Request message contains the information on the serving network(s) associated with the PAA.
3. The PaC that receives the PANA-Start-Request message(s) extracts the serving network information from the received message.

It is noted that a PaC may not need to configure an IP address when it uses an unspecified IP address for receiving serving network information using PANA. In such case, the PAA will send information encapsulated in an IP packet to the PaC by using a Layer 2-specific packet delivery mechanism and bypassing the regular IP stack implementation According to an alternate embodiment of the invention, serving network information may be advertised to clients by using the Router Discovery mechanism of IPv4 or IPv6. A client node needs to configure an IP address to obtain serving network information using Router Discovery. The advertising sequence can be performed as follows:
1. A client node sends a Router Solicitation message that may be multicast within the access network or unicast to a particular router.
2. Each router that receives the Router Solicitation message sends a Router Advertisement message back to the client node. The Router Advertisement message contains information on the serving network(s) connected to the router.
3. The client node that receives the Router Advertisement message(s) extracts the serving network information from the received message.

Authentication

When PANA is used for advertising the information on the serving networks, it also can be used for its original purpose, i.e., authenticating and authorizing the clients. IKE (Internet Key Exchange) can also be used for authenticating the clients. When IKE is used for client authentication, the client node can immediately establish a secure tunnel. IKE is a key management protocol standard that is used in conjunction with the IPSec standard. IPSec is an IP security feature that provides robust authentication and encryption of IP packets.

On the other hand, when a PAA is not co-located with an access router, PANA is always used for authenticating the client. When PANA is used for client authentication, the authentication procedure continues from Step 3 in the previous section:

4. The PaC sends a PANA-Start-Answer message to a PAA in response to a PANA-Start-Request message. The PaC may specify one or more serving network it wishes to access, by inserting the information on the desired serving network(s) in the PANA-Start-Answer message.
5. The PAA then sends a PANA-Auth-Request message, carrying an EAP (Extensible Authentication Protocol) message and a PANA session identifier. The PANA-Auth-Request message may contain the information on the serving network that is associated with the ongoing authentication. EAP is a general protocol for authentication that also supports multiple authentication methods, such as token cards, one-time passwords, certificates, public key authentication and smart cards. The object of authentication is to confirm the identity of the client or user.

6. The PaC returns a PANA-Auth-Answer message in response to the PANA-Auth-Request message, carrying an EAP message.
7. Steps 5 and 6 are repeated as necessary until the EAP authentication process completes.
8. When the EAP authentication process completes, the PAA sends a PANA-Bind-Request message to the PaC, containing an EAP Success/Failure message. If the EAP authentication completes successfully, a list of IP addresses of the access routers associated with the PAA is additionally contained in the message. If the PAA is not co-located with an access router, a list of access router names associated with the PAA and connected to the serving network(s) is additionally contained in the message. The PANA-Bind-Request may contain the information on the serving network the PAA authorizes access to the PaC. If the client authentication fails, the client node will be denied access to any serving network.
9. The PaC returns a PANA-Bind-Answer message to the PAA.
10. When EAP authentication is needed for more than one serving network, Steps 5 to 9 are repeated for each serving network.

In the above sequence, it is assumed that at least one EAP authentication method that is capable of deriving an EAP Master Session Key (MSK) is used. The derived MSK is shared between the PaC and the PAA. Upon successful completion of an EAP authentication process with a derived MSK, the PAA sends at least the following information to each access router associated with the PAA and connected to the serving network(s) that are specified by the PaC in Step 4, so as to authorize the PaC to have access to the serving network:

PANA session identifier.
IKE pre-shared secret data which is derived from the MSK.

Establishing S Cure Tunnel to Access Router

Upon successful completion of reception of serving network advertising information and client node authentication (in the case of using PANA for advertising and authentication) or of receiving serving network advertising information (in the case of using Router Discovery), the client knows which access router associated with the PAA is connected to which serving network(s). The client then can perform IKE with any access router to establish an IPSec tunnel.

IKE is a hybrid protocol which implements the Oakley key exchange and Skeme key exchange inside the Internet Security Association and Key Management Protocol (ISAKMP) framework. (ISAKMP, Oakley, and Skeme are security protocols implemented by IKE.) IPSec is a framework of open standards that provides data confidentiality, data integrity, and data authentication between participating peers. IPSec provides these security services at the IP layer; it uses IKE to handle negotiation of protocols and algorithms based on local policy, and to generate the encryption and authentication keys to be used by IPSec. IPSec can be used to protect one or more data flows between a pair of hosts, between a pair of security gateways, or between a security gateway and a host.

If authentication was performed before entering the secure tunnel establishment phase, the IKE pre-shared key that was derived in the authentication procedure is used for IKE to authenticate the IKE end-points (thus no other client authentication is performed within IKE negotiation). The client can use the PANA session identifier or a valid IP address in the access network as the ISAKMP Security Association (ISAMKP SA) identifier in IKEv1 or the IKE_SA identifier in IKEv2. When an IP address is used as the ISAKMP SA identifier in IKEv1, the IKEv1 Main Mode needs to be used.

Otherwise, if client authentication was not performed before entering the secure tunnel establishment phase, an authentication procedure other than using an IKE pre-shared key must be performed within the IKE negotiation. In this case, an identifier that is specific to the authentication procedure is used.

When an access router is connected to multiple serving networks (such as access router AR2 in FIG. 1), a mechanism for binding an IPSec tunnel to a specific serving network is needed so that the access router can (1) assign an IPSec tunnel inner address from the address block of the serving network and (2) forward packets between the client and the serving network. The binding can be created in the IKE negotiation by using the information on the serving network as the IPSec SA identifier credential. In this way, it is possible to establish multiple IPSec tunnels between a client node and an access router, each bound to a distinct serving network, as shown in FIG. 2. Multiple schemes can be employed, such as single PANA authentication and session identifier for an entire access network, single PANA authentication and identifier for each access router, or single PANA authentication and identifier for each serving network. Where there is authentication for each serving network, the PANA session identifier may be used as an identifier for IKE, but in other cases the client has to use/generate a unique identifier for IKE for a specific serving network or other information/identifier exchange/negotiation may be required during IKE When IKEv2 is used for establishing an IPSec tunnel, it is also possible to establish multiple IPSec tunnels between a client node and an access router, each bound to a serving network. When an access router is connected to only one serving network, there is only one binding and other identifiers may be used.

The inner address of an IPSec tunnel SA may be assigned during IKE negotiation by the access router that terminates the tunnel. For example, IKEv2 defines a Configuration Payload exchange to assign an IPSec tunnel inner address. When an inner address is not assigned in the IKE negotiation, DHCP may be performed through the established IPSec tunnel. In any case, the assigned IPSec inner address must be valid for the serving network bound to the IPSec SA. Other configuration information such as a subnet prefix (or a netmask), a DNS (Domain Name System) server address, or a DHCP server address also may be assigned in the IKE negotiation. In addition, when the client node is an IPv6 router, an IPv6 prefix delegated from the serving network also can be assigned by running DHCPv6 with prefix delegation option through the established IPSec tunnel. In this case, the delegated prefix can be shared among other client nodes for which the client router serves as the client-side gateway to the serving network.

An access router can perform Quality of Service (QoS) control on the IPSec tunnels it terminates, to provide differentiated services among IPSec tunnels from different client nodes and/or among IPSec tunnels from the same client nodes. The advertising information on the serving network can also contain the QoS information so that a client node can specify QoS information during IPSec SA negotiation in IKE.

The present invention also allows multiple access routers on the same access network to connect to the same serving network. Thus, load balancing among access routers is possible. When PANA is used in serving network advertising and authentication, a list of access routers contained in a PANA- Bind-Request message during the authentication phase can be used for identifying which access router is connected to which serving network.

Broadcast and/or multicast traffic also may be transmitted through an IPSec tunnel. An access router may have a configuration option for allowing and prohibiting transmission of broadcast/multicast traffic through an IPSec tunnel.

A client node that has an IPSec tunnel to an access router may not use the IPSec tunnel to send or receive packets to other nodes in the access network. Such packets include application traffic such as printing data to a local printer in the access network.

Usage Scenarios

Figure 3:
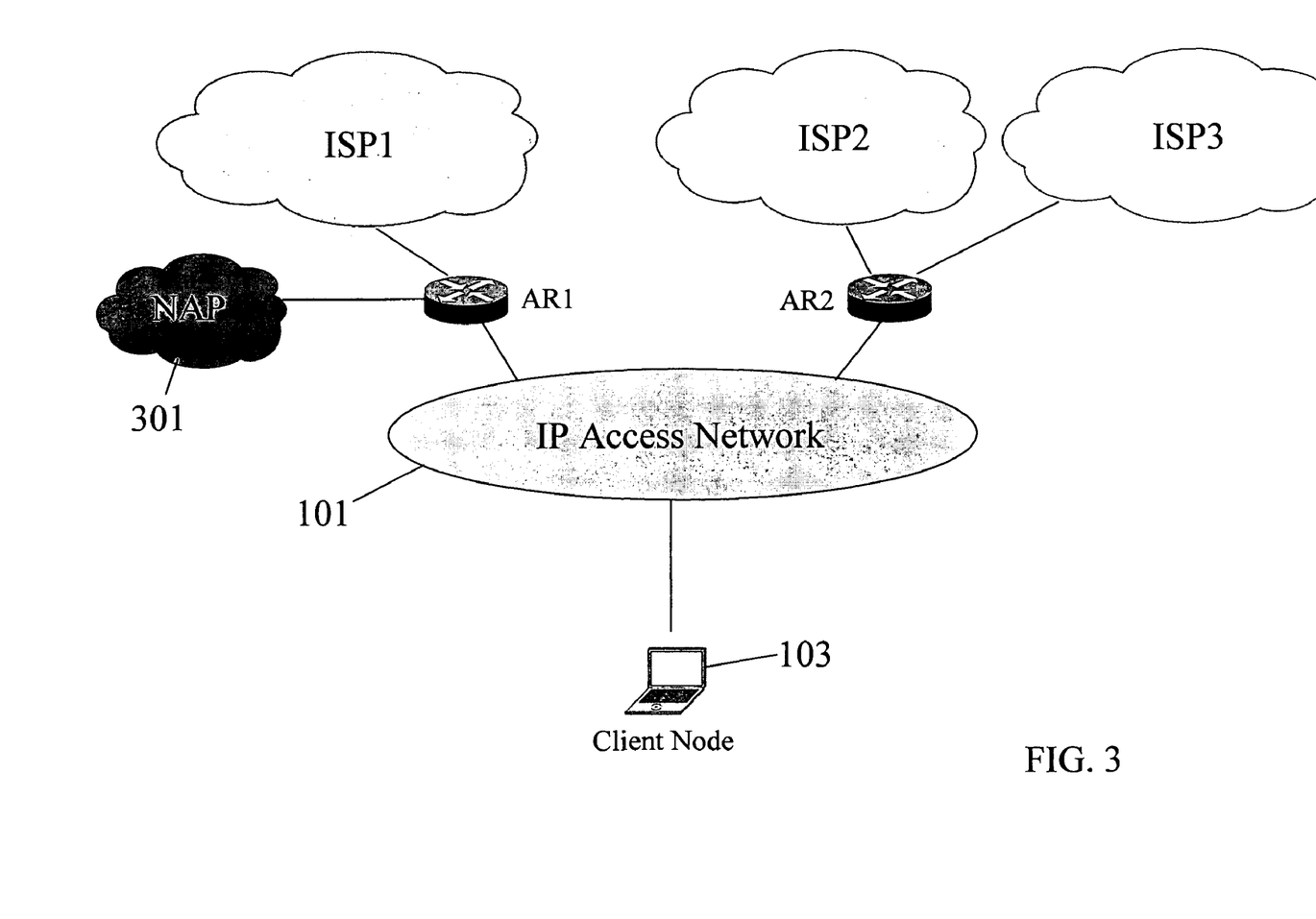
FIG. 3 is a diagram of a network topology according to one preferred embodiment of the invention using ISPs and NAPs.
Figure 4:
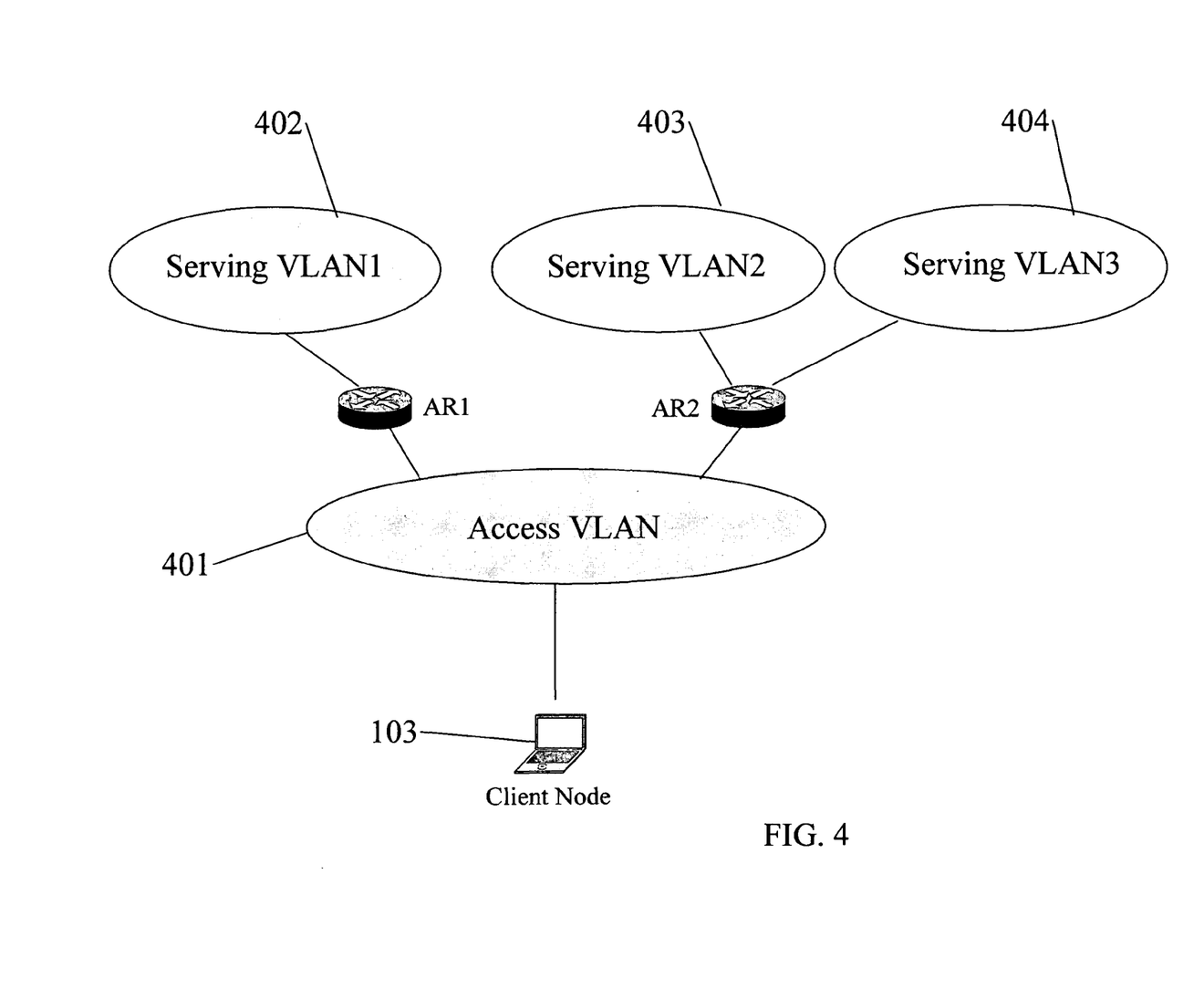
FIGS. 4 and 5 are diagrams of a network topology according to one preferred embodiment of the invention using access VLANS and serving VLANS.

When the present invention is used in DSL or Wireless LAN hotspots, a serving network can be an ISP network or a NAP exchange network. The access network is typically owned by a single NAP, but it is also possible for multiple NAPs to share the same access network. An example physical topology when a single NAP 301 owns the access network 101 is shown in FIG. 3.

In this example, the client node 103 is able to selectively establish connectivity to one, some or all of the serving networks owned by ISP1, ISP2 ISP3 or NAP 301. When PANA is used to authenticate the client node, it is possible to perform two EAP authentications in a single PANA session, one for the ISP and the other for the NAP, possibly with using different client identifiers. When the client node 103 creates multiple IPSec tunnels to different ISPs, multihoming is achieved. For each provider (either ISP or NAP), the identifier and name of the provider may be used as the serving network information.

Example physical topologies for VLAN usage are shown in FIGS. 4-8. VLAN topologies are used mainly for enterprise network configurations. In the example shown in FIG. 4, there are four VLANs configured in the network. The Access VLAN 401 is used as the access network for the client node 103. The Serving VLANs 402-404 are VLANs that are used as the serving networks. Connectivity to the Serving VLANs is made only through IPSec tunnels established between the client node 103 and access routers AR1 and AR2 (the access routers may be virtual routers where the VLANS are configured in the same physical network). For each Serving VLAN, the identifier and name of the VLAN is used as the serving network information.

Figure 5:
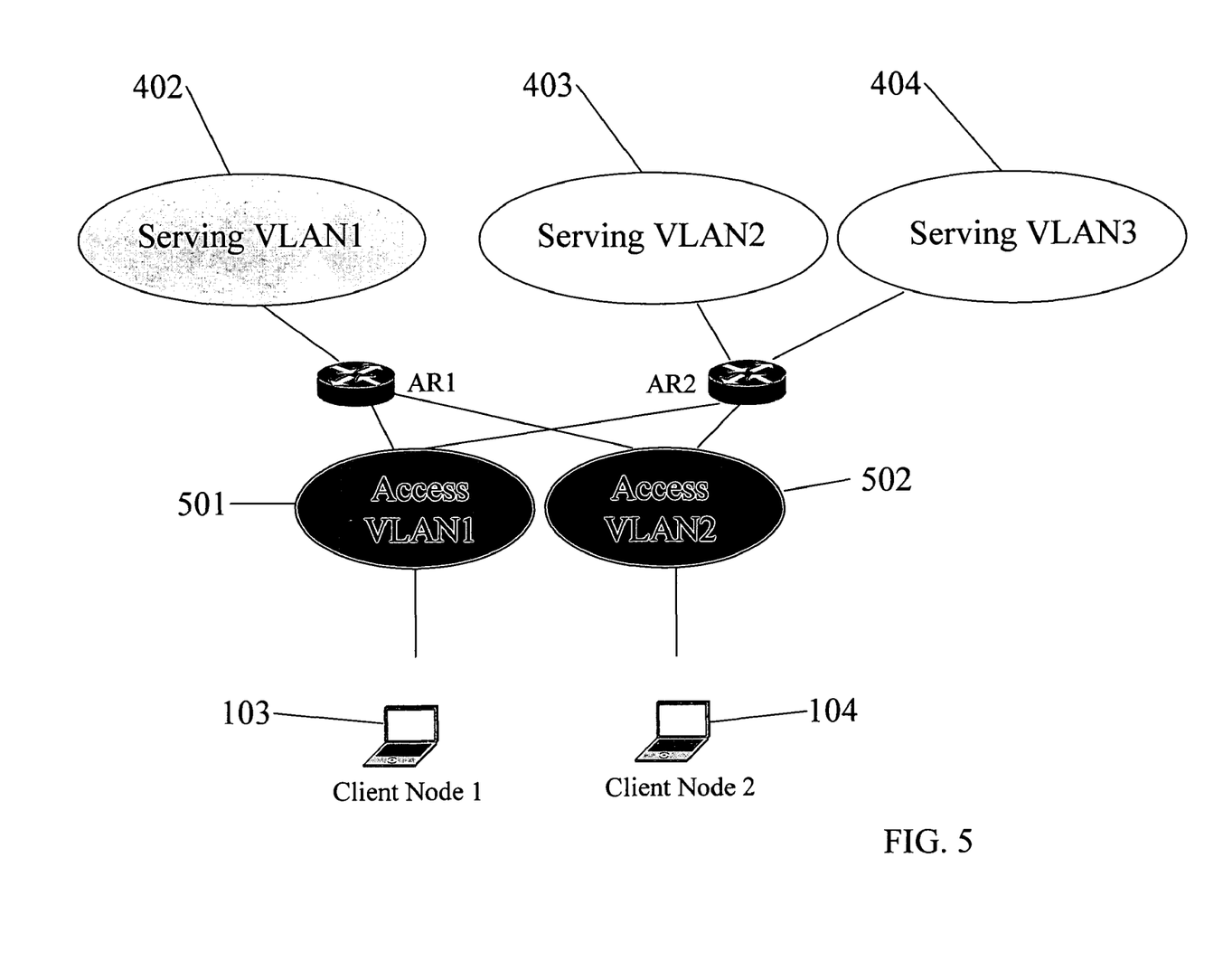

It is also possible for the access network to be composed of multiple Access VLANs 501 and 502 as shown in FIG. 5. This configuration is useful for partitioning traffic in the access network (as a legacy VLAN network does) such that client node 103 may establish connections to the Serving VLANs 402-404 through Access VLAN 501, and client node 104 may establish connections to the Serving VLANs 402-404 through Access VLAN 502, while still allowing the client nodes to create dynamic binding to Serving VLANs.

It will now be explained with reference to FIGS. 6 and 7 how the present invention can be used with a layer-2 Dynamic VLAN model based on a Virtual Access Point (VAP). A Virtual Access Point is a logical entity that exists within a physical Access Point (AP). When a single physical AP supports multiple Virtual APs, each Virtual AP appears to client stations to be an independent physical AP, even though only a single physical AP is present. For example, multiple Virtual APs might exist within a single physical AP, each advertising a distinct SSID and capability set. It is assumed that IEEE 802.11 SSID is used as the information to identify a VLAN. There are two alternate configurations for the present invention as applied to VAPs, as explained below. The two configurations also can be combined.

Figure 6:
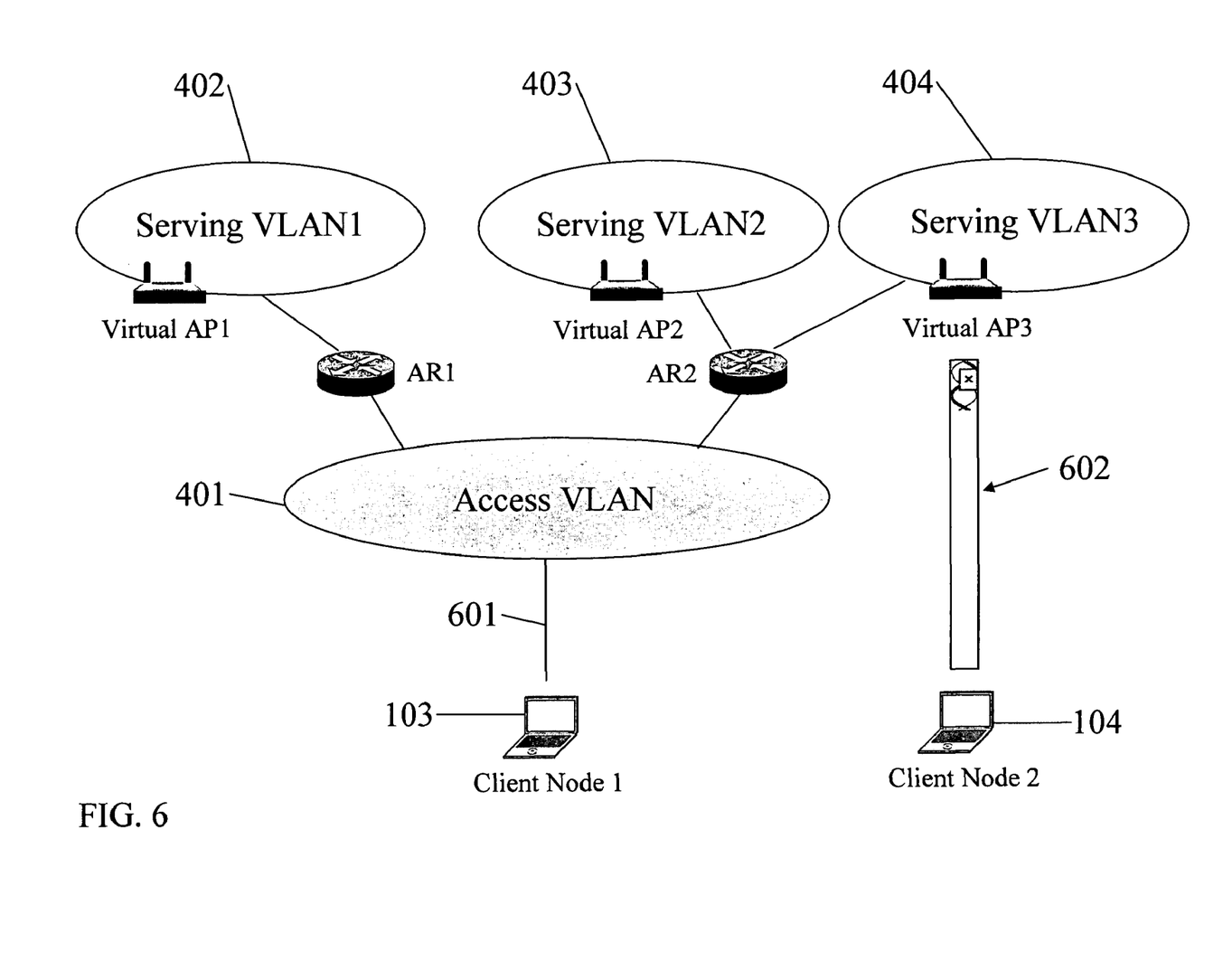
FIGS. 6 and 7 are diagrams of a network topology according to one preferred embodiment of the invention using virtual access points.

If an AP supports both a secure access mechanism as strong as IPSec (or IEEE 802.11i) and dynamic VLAN functionality (i.e. the ability to handle multiple VLANs), it is possible to directly (virtually) connect the AP to the Serving VLANs where a distinct SSID is associated with each Serving VLAN as shown in FIG. 6. Client node 103 uses the present invention through a wired Ethernet connection 601 to connect to the Serving VLANs 1-3, while wireless client node 104 (which supports IEEE 802.11i) can connect directly to a Serving VLAN through a wireless connection 602 to Virtual AP 3. However, the wireless client will not be able to connect to multiple Serving VLANs at the same time unless it has multiple wireless LAN cards (or supports some sort of "virtual station" interface on a single physical layer).

Figure 7:
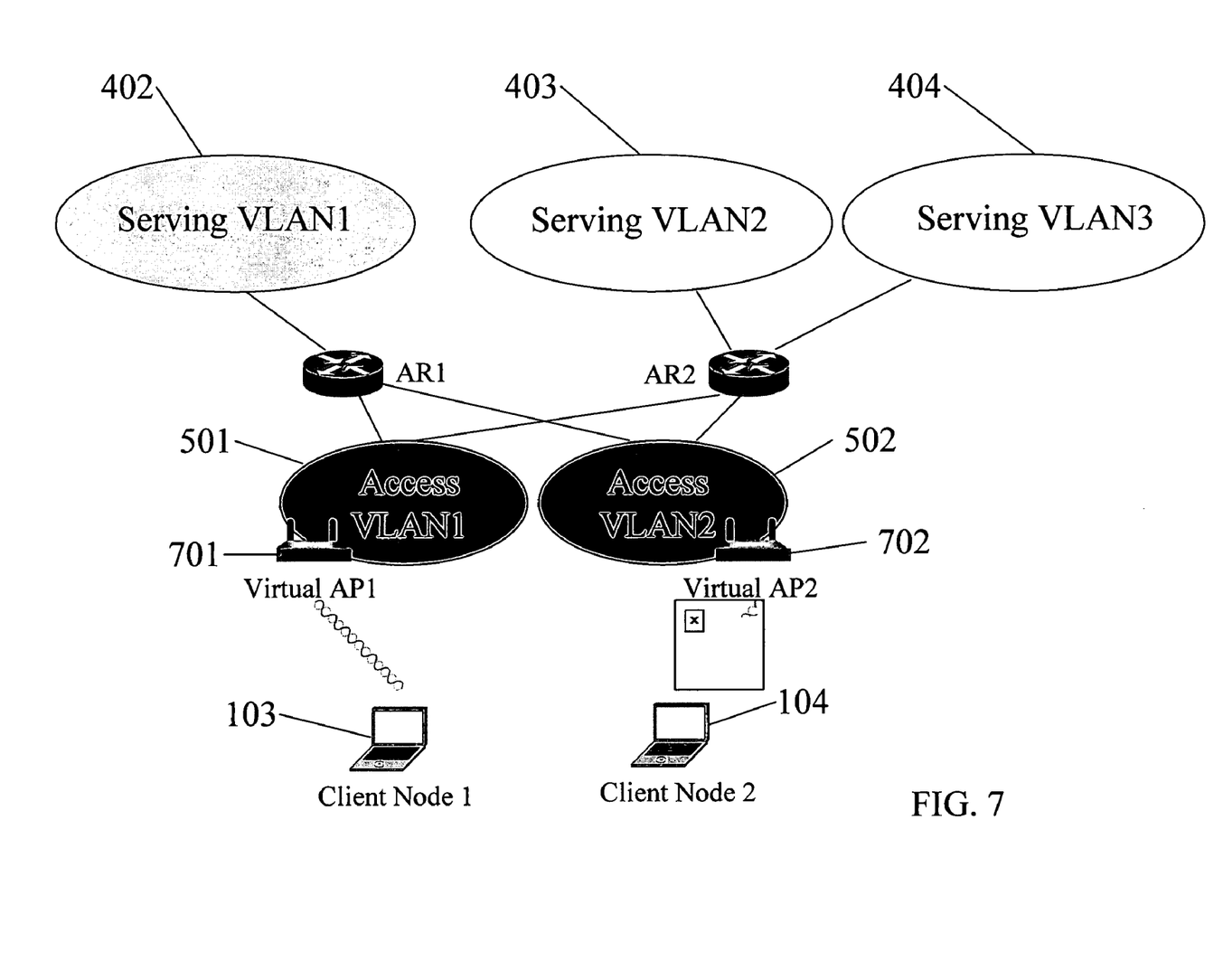

If an AP supports dynamic VLAN functionality but does not support a secure access mechanism as strong as IPsec, the network administrator will not allow the AP to be directly connected to a Serving VLAN, but it may be connected to the Access VLANs as shown in FIG. 7. In this case, a client node 103 (104) first connects to an Access VLAN 501 (502) through a Virtual AP 701 (702), and then uses the present invention to establish connectivity to the Serving VLANs 402-404.

Figure 8:
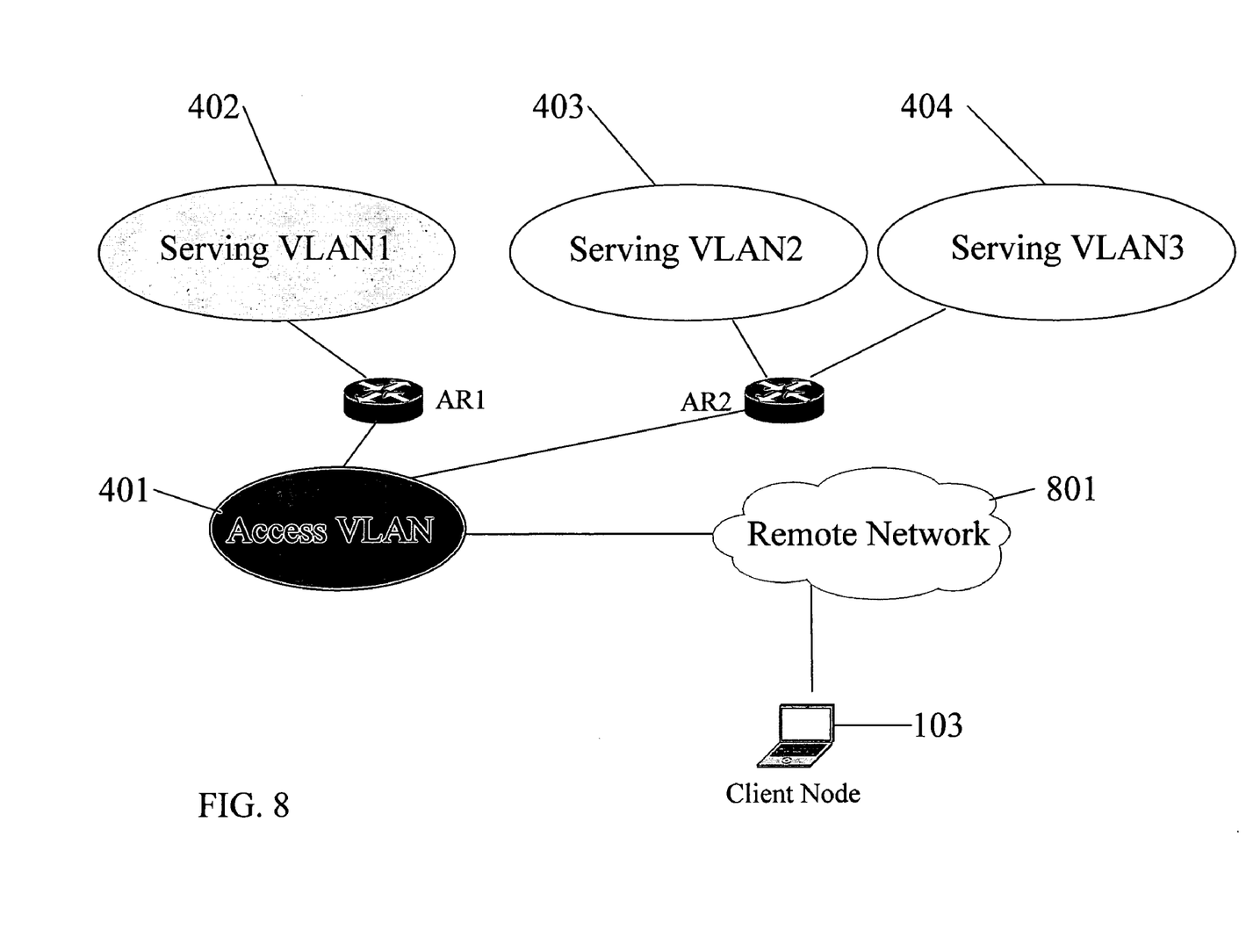
FIG. 8 is a diagram of a network topology according to one preferred embodiment of the invention using a remote network.

As shown in FIG. 8, client node 103 may want to connect to the Serving VLANs 402-404 from a remote network site 801. The present invention can support such a situation provided that the client node 103 knows the IP address of the PAA or the access routers AR1 or AR2 so as to receive service provider advertising information. This is because neither the access routers nor the PAA can broadcast provider information to the remote network.

When the client node is connected to the internal network from an external network through a firewall in the DMZ (DeMilitarized Zone, which is a computer or small subnetwork that sits between a trusted internal network, such as a corporate private LAN, and an untrusted external network, such as the public Internet), the following scenarios are presented:

Where internal network management policy mandates that all access from the external network is to be protected with IPSec through an IPSec gateway in the DMZ (such as where an access router of a Serving VLAN is placed in the internal network)—In this case, packets transmitted through an IPSec tunnel established between the client node and an access router of a Serving VLAN will be protected with another IPSec tunnel established between the client node and the IPSec VPN gateway (double IPsec).

Where internal network management policy mandates that all access from the external network is to be protected with IPsec, but the IPsec gateway does not have to be in the DMZ—In this case, an additional IPsec tunnel is not needed.

The present invention also can be used with Mobile IP (such as MIPv4) in the following ways. First, since the present invention allows a client node to dynamically switch from one serving network to another, a stable IP address is needed for an application that needs a persistent connectivity to its corresponding node when switching occurs (it will be noted that the switching can occur on a mobile client node that does not physically move). By using Mobile IP, a home address can be used as such a stable IP address.

Second, a mobile client node that is connected to a serving network may physically move from an area covered by one access network to an area covered by another access network, where the access network may be an access network of a serving network or an access network in a remote network. By using Mobile IP, the client node can seamlessly move among different access networks without losing application connection.

In both cases, the IP header that contains the home address in a packet appears inside the IPSec tunnel header. In the case where the client node is connected from an external site to an internal serving network through a DMZ, an additional Mobile IP may be used to support external mobility.

In VLAN scenarios, if a mobile client node establishes connectivity to multiple Serving VLANs and each Serving VLAN uses its own home agent, the client node may run dual Mobile IP in parallel using multiple home addresses. The above discussion applies also to the case where Mobile IPv6 is used instead of Mobile IP.

Broad Scope of the Invention

While illustrative embodiments of the invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" (i.e., not step on is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A method of dynamically connecting a client node to a serving network, comprising the steps of:
   providing an access network to which a client node has a network connection;
   providing at least one access router having a network connection to said access network and having a network connection to at least one serving network;
   sending serving network provider advertising information to said client node, said network provider advertising information including a provider identifier advertised per each service provider;
   receiving from said client node serving network provider information specifying a serving network to which said client node desires access; and
   establishing a secure communication tunnel between said client node and said access router through said access network using information of said serving network as a security association identifier of said secure communication tunnel, such that said client node is able to send and receive data packets to and from the serving network specified by said client node within said secure communication tunnel through said access network.

2. A method as set forth in claim 1, further comprising the step of authenticating said client node prior to establishing said secure communication tunnel.

3. A method as set forth in claim 1, further comprising the step of providing a second access router having a network connection to said access network and having network connections to at least two serving networks.

4. A method of dynamically connecting a client node to a serving network, comprising the steps of:
   providing an access network to which a client node has a network connection;
   providing at least one access router having a network connection to said access network and having a network connection to at least one serving network;
   sending serving network provider advertising information to said client node;
   receiving from said client node serving network provider information specifying a serving network to which said client node desires access; and
   establishing a communication tunnel between said client node and said access router through said access network, such that said client node is able to send and receive data packets to and from the serving network specified by said client node within said communication tunnel through said access network;
   further comprising the step of providing a second access router having a network connection to said access network and having network connections to at least two serving networks;
   wherein when a serving network specified by said client node is associated with said second access router, said establishing step further comprises the step of binding said communication tunnel to said specified serving network associated with said second access router by using serving network information of said specified serving network as a security association identifier of said communication tunnel.

5. A method as set forth in claim 1, wherein said access router has network connections to at least two serving networks, said method further comprising the step of establishing a second secure communication tunnel between said client node and said access router through said access network, such that said client node is able to selectively send and receive data packets to and from each of said two serving networks.

6. A method of dynamically connecting a client node to a serving network, comprising the steps of:
   providing an access network to which a client node has a network connection;
   providing at least one access router having a network connection to said access network and having a network connection to at least one serving network;
   sending serving network provider advertising information to said client node;
   receiving from said client node serving network provider information specifying a serving network to which said client node desires access; and
   establishing a communication tunnel between said client node and said access router through said access network, such that said client node is able to send and receive data packets to and from the serving network specified by said client node within said communication tunnel through said access network;

further comprising the step of providing a second access router having a network connection to said access network and a network connection to at least one serving network, said method further comprising the step of establishing a second communication tunnel between said client node and said second access router through said access network, such that said client node is able to selectively send and receive data packets to and from each of said serving networks associated with said access routers through said communication tunnels.

7. A method as set forth in claim 1, wherein said step of sending serving network provider advertising information comprises the step of using a PANA protocol.

8. A method as set forth in claim 1, wherein said step of sending serving network provider advertising information comprises the step of using a Router Discovery mechanism.

9. A method as set forth in claim 1, wherein said at least one serving network comprises an Internet Service Provider network.

10. A method as set forth in claim 1, wherein said at least one serving network comprises a Network Access Provider network.

11. A method as set forth in claim 1, wherein said at least one serving network comprises a VLAN network.

12. A method as set forth in claim 11, further comprising the step of providing a virtual access point in said VLAN serving network, through which a client node may connect directly to said VLAN serving network.

13. A method as set forth in claim 1, wherein said access network comprises an IP access network.

14. A method as set forth in claim 1, wherein said access network comprises a VLAN access network.

15. A method as set forth in claim 14, wherein said VLAN access network is partitioned into multiple VLAN access sub-networks.

16. A method as set forth in claim 14, further comprising the step of providing a virtual access point in said VLAN access network, through which a client node may connect to said VLAN access network.

17. A method as set forth in claim 1, wherein said client node connects to said access network via a remote network.

18. A method as set forth in claim 1, wherein the step of establishing said secure communication tunnel comprises the step of using an IPSec key management protocol.

19. A method as set forth in claim 1, wherein said client node is a mobile node, and said network connection of said client node to said access network is a wireless connection.

20. A method as set forth in claim 1, wherein said step of sending serving network provider advertising information is performed using network layer protocols, and wherein said establishing step further comprises the step of binding said secure communication tunnel to a specified serving network associated with an access router by using a PANA session identifier or an IP address as said security association identifier of said secure communication tunnel.

21. A method as set forth in claim 20, further comprising the step of establishing said secure communication tunnel using an IPSec key management protocol.

22. A method of connecting a client node to a serving network, comprising the steps of:
    providing an access router having a network connection to at least two serving networks;
    sending serving network provider advertising information to said client node;
    receiving from said client node serving network information specifying a serving network to which said client node desires to have access;
    establishing a secure communication tunnel between said client node and said access router through said access network, such that said client node is able to send and receive data packets to and from the serving network specified by said client node within said secure communication tunnel through said access network; and
    binding said secure communication tunnel to said specified serving network by using serving network information of said specified serving network as a security association identifier of said secure communication tunnel.

23. A method as set forth in claim 22, wherein said step of sending serving network provider advertising information is performed using network layer protocols, and wherein said establishing step further comprises the step of binding said secure communication tunnel to a specified serving network associated with an access router by using a PANA session identifier or an IP address as said security association identifier of said secure communication tunnel.

24. A method as set forth in claim 23, further comprising the step of establishing said secure communication tunnel using an IPSec key management protocol.

25. The method of claim 1, wherein said advertising information includes said provider identifier being a unique identifier that identifies a provider and a provider name character string that represents the name of the provider.

26. The method of claim 25, wherein said advertising information is advertised using protocol for carrying authentication information for network access (PANA).

* * * * *

UNITED STATES PATENT AND TRADEMARK OFFICE
CERTIFICATE OF CORRECTION

| | |
|---|---|
| PATENT NO. | : 7,860,978 B2 |
| APPLICATION NO. | : 10/761347 |
| DATED | : December 28, 2010 |
| INVENTOR(S) | : Oba et al. |

It is certified that error appears in the above-identified patent and that said Letters Patent is hereby corrected as shown below:

On Title Page 2, in item (56), under "OTHER PUBLICATIONS", in Column 2, Line 7, delete "Miltiple-" and insert -- Multiple- --, therefor.

In the Specification

In Column 3, Line 33, delete "DESCRIPTION" and insert -- BRIEF DESCRIPTION --, therefor.

In Column 3, Line 55, delete "DESCRIPTION" and insert -- DETAILED DESCRIPTION --, therefor.

In Column 4, Line 50, delete "N1, and" and insert -- N1 and --, therefor.

In Column 5, Line 31, delete "provide" and insert -- provider --, therefor.

In Column 6, Line 24, delete "implementation" and insert -- implementation. --, therefor.

In Column 8, Line 32, delete "IKE" and insert -- IKE. --, therefor.

In Column 9, Line 23, delete "ISP2 ISP3" and insert -- ISP2, ISP3 --, therefor.

In Column 10, Line 3, delete "(i.e." and insert -- (i.e., --, therefor.

In Column 11, Line 33, delete "step on" and insert -- step of) --, therefor.

Signed and Sealed this
Twenty-eighth Day of October, 2014

Michelle K. Lee
*Deputy Director of the United States Patent and Trademark Office*